United States Patent [19]
Oura

[11] Patent Number: 4,470,113
[45] Date of Patent: Sep. 4, 1984

[54] INFORMATION PROCESSING UNIT
[75] Inventor: Toshio Oura, Tokyo, Japan
[73] Assignee: Nippon Electric Co., Ltd., Tokyo, Japan
[21] Appl. No.: 339,223
[22] Filed: Jan. 13, 1982
[30] Foreign Application Priority Data
Jan. 13, 1981 [JP] Japan .................................. 56-3382
[51] Int. Cl.³ ............................................... G06F 3/04
[52] U.S. Cl. .................................................... 364/200
[58] Field of Search ... 364/200 MS File, 900 MS File
[56] References Cited
U.S. PATENT DOCUMENTS

| 4,028,663 | 6/1977 | Royer et al. | 364/900 |
| 4,047,162 | 9/1977 | Dorey et al. | 364/900 |
| 4,124,891 | 11/1978 | Weller et al. | 364/200 |
| 4,212,080 | 7/1980 | Milliken | 364/900 |
| 4,229,791 | 10/1980 | Levy et al. | 364/200 |

Primary Examiner—Jerry Smith
Assistant Examiner—Mark P. Watson
Attorney, Agent, or Firm—Sughrue, Mion, Zinn, Macpeak and Seas

[57] ABSTRACT

An information processing unit, such as a central processor, microprocessor or one-chip microcomputer, which can be used as either a master unit or a slave unit yet does not require the provision of extra external terminals for control signals. The unit is provided with first and second bidirectional input/output ports and an internal bus coupled to both of the first and second input/output ports. The input/output mode of the two busses can be controlled either by an internally-generated control signal or by an externally-supplied control signal inputted to the unit. The one of the first and second control signals used for controlling the transmission modes of the input/output ports is determined in accordance with data input through one of the input/output ports and stored internally of the unit.

4 Claims, 6 Drawing Figures

INFORMATION PROCESSING UNIT

BACKGROUND OF THE INVENTION

The present invention relates to an information processing unit, and more particularly, to an information processing unit having a circuit for transmitting and/or receiving information and being adapted for use in a multi-processor system.

In a typical information handling system, an information processing unit such as a central processor, a microprocessor or a one-chip microcomputer is coupled to memories and one or more peripheral devices (for instance, keyboards, display devices, printers, etc.). The coupling is effected by means of one or more signal lines. In this arrangement, the information processing unit acts usually as a control unit, while the memory or the peripheral devices act as a controlled unit. Specifically the information processing unit performs the function of managing the memory and the peripheral devices and the memory and peripheral devices are designed so as to operate under the control of the information processing unit. Among the control functions performed by the information processing unit, a representative and important function is control of information transmission, wherein the processing unit generates control signals indicating whether information is to be received from or transmitted to a controlled device. (Such signals are normally called a "read control signal" and a "write control signal", respectively). Accordingly, a transmission control circuit for generating and outputting the control signal is necessitated on the side of the information processing unit where the control unit is located. On the other hand, on the side of the information processing unit or device where the controlled unit is located a transmission processing circuit is necessitated which receives the control signal and carries out processing of information input or output exactly as indicated by the control signal.

In a prior art, approach a transmission control circuit was provided which was used as an output circuit for control signal output use only, and a transmission processing circuit was provided which was used as an input circuit for control signal receiving use only. In other words, a hardware circuit was designed such that the unit performing the control function operated as a master unit and the unit performing the controlled function operated as a slave unit. In such a master-slave type information handling system, the master side cannot operate as a slave and the slave side cannot operate as a master. Accordingly, unless a transmission control circuit is provided in the unit performing the controlled function to generate and output an appropriate control signal, it is impossible to make the master unit (information processing unit) operate virtually as a slave. The absence of such a capability is a specific drawback of the prior art approaches.

A similar problem resides in a multi-processor system composed of a plurality of information processing units, particularly in a multi-microprocessor system. Though this system can execute a higher grade of program processing than a single-processor system (and therefore is expected to be widely used in the information handling field in the future,), at present such systems suffer a drawback in that the various information processing units which make up the system are all designed so as to operate as masters and are thus each provided with a transmission control circuit only. Therefore, unless a circuit equivalent to the transmission processing circuit is added independently, information transmission cannot be achieved between the information processing units. Where micro-processors are used as information processing units, the number of external terminals for connecting signal lines cannot be made large. This is due to the fact that as a micro-processor is formed on a semiconductor chip using semiconductor integrated circuit techniques, any increase in the number of external terminals on the semiconductor integrated circuit chip is most difficult and would lead to a very high manufacturing cost.

A multi-processor system is required to achieve information transmission at a high speed for information processing in applications imposing severe time limitations such as video pattern processing, audio or sound synthesis processing, control processing for medical and diagnostic instruments, aircraft instruments, etc. Moreover, a multi-processor system should occupy only a minimum space and be as simple as possible. Also an effort must be made to not destroy the utility of the multiprocessor system as a general purpose information processing unit. To this effect, the various processors should be usable in both a multi-processor system and a single-processor system.

However, heretofore known information processing units could not fully resolve and meet the above-mentioned problems and requirements, and especially had various shortcomings in a multiprocessor system.

It would be a rather simple matter to add a transmission processing circuit to an information processing unit already provided with a transmission control circuit. In that case, however, space for the transmission processing circuit is necessitated, and accordingly the chip size of the micro-processor becomes large. Accordingly, it is nearly impossible to realize the micro-processor at a low cost. Moreover, such a micro-processor would require two external terminals for the added transmission processing circuit to receive read and write control signals. In a micro-processor with a limited number of terminals, terminals which would more effectively be used for information transmission must be allotted for the read and write control signals for the transmission processing circuit. Consequently, parallel information transmission becomes impossible, and the processor is limited to serial information transmission, and hence high speed transmission cannot be achieved. Furthermore, in a single-processor system, provision of a transmission processing circuit and its accompanying terminals is also wasteful.

On the other hand, a memory-based type multiprocessor system can be constructed in which direct coupling of information processing units operating as masters to each other is avoided and instead a memory that is accessible in common by the various information processing units is used as an information transmission medium. However, this system has a shortcoming that high-speed transmission is very difficult because transmitted information must always pass through a memory. In addition, a control signal generator circuit for controlling and accessing the memory as well as external terminal therefor become necessary. It has been found that there is no cost advantage in such a system. Furthermore, system construction and information transmission programming become more complex, and therefore, increase in expense and time for these is inevitable.

It is therefore one object of the present invention to provide an information processing unit which can operate both as a control unit (master) and as a controlled unit (slave).

Another object of the present invention is to provide an information processing unit which can send and/or receive information at a high speed.

Still another object of the present invention is to provide such a microprocessor that is suitable for a multi-processor system.

Yet another object of the present invention is to provide an information processing unit having both a transmission control function and a transmission processing function.

A further object of the present invention is to provide an information processing unit which achieves effective utilization of terminals and which is especially effective as a micro-processor.

A still further object of the present invention is to provide a general purpose processor that is applicable not ony to a multiprocessor system but also to a single-processor system.

A yet further object of the present invention is to provide an information processing unit that is suitable for parallel information transmission.

SUMMARY OF THE INVENTION

In accordance with these and other objects of the invention, an information processing unit; is provided including means for transferring information, means for generating a first input control signal and a first output control signal, means for receiving from an external source a second input control signal and a second output control signal, means for controlling the input/output state of transferring means such that the transferring means is set in an output state in response to the first input signal or the second output signal and an input condition in response to the first output control signal or the second input control signal, means for generating a mode signal, and means responsive to the mode signal for selecting whether the transferring means is controlled by the first input and output signals or by the second input and output control signals. When the first input and output control signals generated inside of the unit are selected for control, the transferring means is controlled by the internally generated input and output control signals, which are also transmitted externally. Therefore, the transferring means outputs, in response to the first input control signal, data from inside the unit to an external unit, which is in turn controlled by the first input control signal from the processing unit and receives the outputted data. Similarly, the transferring means inputs, in response to the first output control signal, data from the external unit, which in turn outputs that data, controlled by the first output control signal from the processing unit. Thus, the processing unit acts as a master unit. When the second input and output control signals, which are received from the outside through the same terminals through which the first input and control signals are transmitted to the, are selected, the transferring means inputs data from the outside in response to the received second input control signal and outputs data from the inside to the outside in response to the received second output control signal. Therefore, the processing unit acts in this case as a slave unit.

In other words, the mode signal designates whether the information processing unit is to be used as a master or it is to be used as a slave. In response to this designation, when the processing unit is to be used as a master, the transferring means is controlled by the first control signals generated by the generating means, whereas when the processing unit is to be used as a slave, the transferring means is controlled by the second control signals received from an external unit. The mode signal for designating the master or the slave may be set either within the processing unit or externally of the processing unit. In addition, the means for applying the selected control signals to the transferring means can be used in common whether the processing unit operates as a master or as a slave. Furthermore, as already mentioned, the output terminals for the first control signals to be applied to an external unit when the processing unit operates as a master and the input terminals for the second control signals received from an external unit when the processing unit operates as a slave can be provided in common. These common input/output terminals for the control signals may be used also as terminals through which data is outputted from the processing unit to the external unit or vice versa.

As described above, it is unnecessary for the information processing unit according to the present invention to be provided with a transmission controlling circuit used solely when the processing unit operates as a master and another transmission processing circuit used solely when it operates as a slave. Moreover, since every operation can be processed and controlled by a common circuit, the circuit hardware needed can be made very small. In addition, since the internal or external control signals are automatically selected depending upon the contents of the storing means, the input/output operation of information is extremely simple.

It is to be noted that the designation of the input/output condition (operating mode) of the transferring means should be effected before information transmission, and also it should be sustained until the information transmission is completed. To accomplish this in the prior art multi-processor system, signal lines for transferring control signals from the slave side to the master side and terminals therefore had to be provided separately from the control signal lines from the master to the slave and their terminals. However, according to the present invention, the control signal lines and terminals can be made common for the two directions. Moreover, it is unnecessary to independently provide a signal line and a terminal for the signal used for setting the processor in the slave condition. Further, the means for controlling the transferring means can be used in common, that is, both when the processing unit is to operate as a master and as a slave. Namely, the input terminals and the output terminals for data transfer through the transferring means can be provided in common. The common use of the terminals is quite effective for a micro-processor having a severely limited number of terminals. Furthermore, since the control signal terminals and data terminals can be provided in common, it becomes unnecessary to expropriate any of the information transmitting terminals for this function, and hence it becomes possible for the first time to transmit information in a parallel form. Therefore, highly efficient and high-speed transmission can be executed by the processing unit of the present invention.

Moreover, the processor according to the present invention is applicable to both a multi-processor system and a single-processor system. In either case, no wasted (unused) circuit need be included therein. Accordingly, there is provided an information processing unit of low cost which suffers no degradation of its general usefulness.

Still further, an information processing unit according to the present invention can achieve information transmission directly with another processor because it can internally generate the input and output control signals and the mode signal and also it can receive the input and output control signals from the outside. Accordingly, there is no need to provide an intermediate medium in a transmission path such a memory, as mentioned above. Therefore the system construction becomes simple and it is possible to achieve high-speed transmission. Especially, if the basic concepts of the present invention are applied to an input/output interface section of a micro-processor, an extremely large advantage is achieved, as will be described later.

BRIEF DESCRIPTION OF THE DRAWING

The above-mentioned and other objects, features and advantages of the present invention will become more apparent by reference to the following description of a preferred embodiment of the invention taken in conjunction with the accompanying drawings, wherein.

DESCRIPTION OF THE PREFERRED EMBODIMENTS

Figure 1:
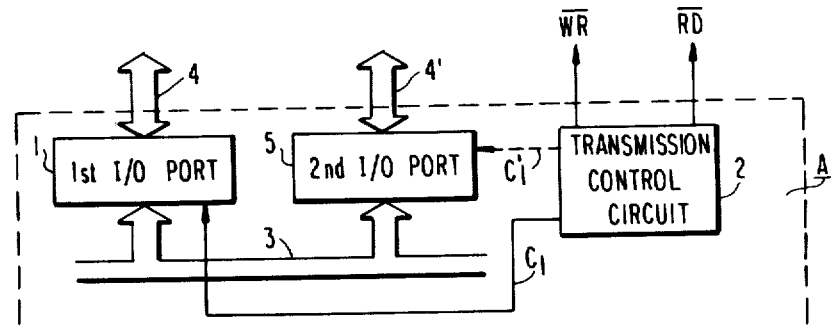
FIG. 1 is a block diagram of an input/output interface section of an information processing unit of the prior art which operates as a master unit.

The construction and operation of an input/output interface section of an information processing unit (master) and an input/output interface section of a controlled unit (for example, a peripheral device such as a display device, a printer, etc., or a memory) that is controlled by the information processing unit of the prior art will be described with reference to FIGS. 1 and 2. An input/output circuit is provided on the side of an information processor A as shown in FIG. 1. In this input/output circuit are necessarily provided input/output ports 1 and 5, each composed of registers for temporarily storing information, a control circuit (transmission control circuit) 2 for by itself generating a first control signal (hereinafter called a write control signal $\overline{WR}$ and a second control signal (hereinafter called a read control signal $\overline{RD}$ which designate whether information is to be written in the registers of the input/output ports 1 and 5 or it is to be read from these registers, and an internal bus 3 used as an information transfer path. The input/output ports 1 and 5 are connected via external terminals to external buses 4 and 4', respectively. The only function of the control circuit is outputting the $\overline{WR}$ and $\overline{RD}$ signals. Further, an input/output circuit (shown in FIG. 2) which is provided on the side of a controlled device B, includes input/output ports 7 and 9 each composed of registers for temporarily storing information, a control circuit (transmission processing circuit) 6 which receives the $\overline{RD}$ and $\overline{WR}$ signals which are sent from the side of the information processor A and executes the processing of writing information in the registers within the input/output ports or the processing of information read out from the registers in response to the received signals, and an internal bus 10. The input/output ports 7 and 9 are connected via external terminals to external buses 8 and 8', respectively.

Here it is assumed that the external buses 4, 4', 8 and 8' and the internal buses 3 and 10 are bidirectional transmission signal lines and the respective external terminals are capable of both input and output use. The function of the respective ports is the inputting and outputting of information of one or more bits. It is to be noted that the reason why two input/output ports are provided in each input/output circuit is because this arrangement is advantageous when data groups of different kinds, such as a set of segment information and digit information or a set of key scan signals (key strobe output signals) and key signal (key matrix input signal) are transferred at the same time and at a high speed. Accordingly, such ports could be provided in any number which is more than one. In addition, in FIGS. 1 and 2 the respective control circuits 2 and 6 must apply signals for effecting write and read control to their own input/output ports (for instance, control signals $C_1$ and $C_1'$ to the ports 1 and 5, and $C_7$ and $C_7'$ to the ports 7 and 9).

However, since the control circuits 2 and 6 provided in the input/output interface sections in the prior art arrangement have different constructions and functions between the processor A and the device B, there exists the following shortcoming. That is, the input/output circuit on the side of the information processor A has no transmission processing circuit equivalent to the circuit 6 and all its terminals. Therefore, the processor A can control the input/output circuit on the side of the controlled device B, but cannot be controlled by the device B. Accordingly, in such a multi-processor system there is a shortcoming that input/output information control in a micro-processor (information processor) A cannot be executed simply and quickly by another micro-processor equivalent to the micro-processor A. Even if a transmission processing circuit were to be provided within the information processor A, separate terminals for receiving the $\overline{RD}$ signal and $\overline{WR}$ signal from another processor (not shown) would be necessitated. Moreover, in the case where a plurality of information processors are provided, terminals for applying a processor chip selection signal ($\overline{CS}$), which designates with which unit or device communication is to be made, is also necessary. Accordingly, in an integrated circuit device having a severely limited number of terminals, this would be accompanied by a great disadvantage that the number of terminals which would have to be provided would be undesirably increased, the cost would be raised, and also the overall apparatus would become large in size.

Figure 2:
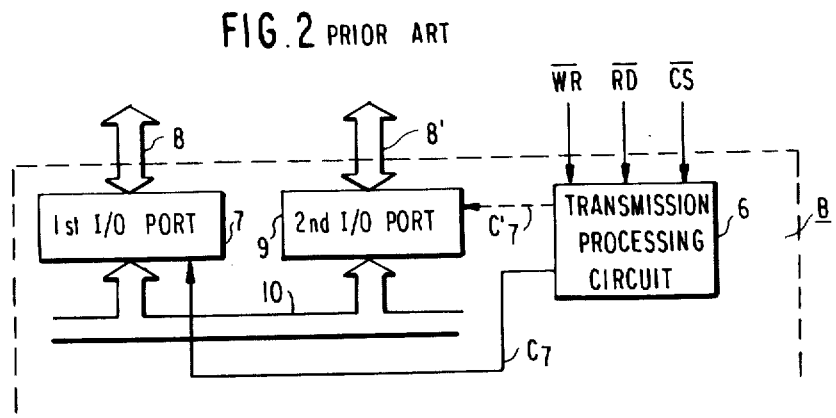
FIG. 2 is a block diagram of an input/output interface section of a controlled unit in the prior art which operates as a slave unit.

As described above, in order to provide the information processor A in FIG. 1 with the capability of operating as a slave, no solution has heretofore been conceived other than to add the transmission processing circuit 6 of FIG. 2 to the information processor A separately from the transmission control circuit 2. On the other hand, if a memory-based system is employed, then there is no need to add the transmission processing circuit 6, but the memory access becomes complex and the transmission speed is also greatly decreased.

Figure 3:
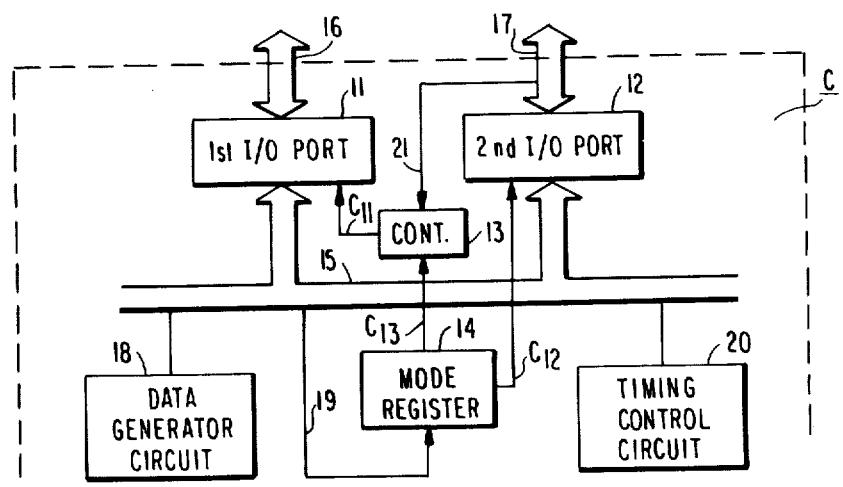
FIG. 3 is a block diagram of an input/output interface section of an information processing unit according to one preferred embodiment of the present invention.

Referring to FIG. 3 which shows an essential part (an input/output interface section and a control data generating section) of an information processing unit C according to one preferred embodiment of the present invention, the input/output interface section includes a first input/output port 11 coupled via external terminals to an external bus 16, a second input/output port 12 coupled via external terminals to an external bus 17, a port control circuit 13 and a mode register 14. The external buses 16 and 17 are bidirectional buses. The first and second input/output ports 11 and 12 are coupled in common to an internal bus 15. Accordingly, the external buses 16 and 17 can be electrically connected to the internal bus 15 through the input/output ports 11 and 12, respectively. In addition, there is provided a circuit 18 for generating data which designates whether the processor C of FIG. 3 acts as a master or as a slave (operating mode). The designating date, which are stored in the mode register 14, are determined by execution of an instruction or a program. These data are written in the mode register 14 via the internal bus 15 and a signal line 19. A timing control circuit 20 is also connected to the internal bus 15, which circuit 20 decodes an instruction (for instance, an information transmission instruction) and generates a read control signal (RD) and a write control signal (WR) within the information processor at a predetermined timing.

According to this embodiment, it is assumed that the data set in the mode register 14 are all generated by the data generator circuit 18. In accordance with the data set in the mode register 14, a signal $C_{13}$ is output from the mode register 14. It is to be noted that in the illustrated embodiment the RD and WR signals transmitted from an external device are input to the port control circuit 13 through the external bus 17 and a signal line 21. On the other hand, the RD and WR signals generated by the timing control circuit 20 are input to the port control circuit 13 through the internal bus 15, the second input/output port 12 and the signal line 21, and also they are transferred through the external bus 17 to a controlled device. The first and second input/output ports 11 and 12 both can have nearly the same construction as the heretofore known input/output port as described with reference to FIG. 1. However, the second input/output port 12 its constructed such that is input-/output operation can be controlled by a control signal $C_{12}$ that is output in accordance with the data in the mode register 14. The port control circuit 13 responds to the control signal $C_{13}$ issued from the mode register 14 for selecting the external or internal RD and WR signals input through the signal line 21, and applies a signal $C_{11}$ for controlling the input/output state to the first input/output port 11 according to the selected RD and WR signals.

The basic operation of an information processor including the above-described circuits elements will now be described. At first, data for designating the operating mode is generated in the data generator circuit 18 and set in the mode register 14. According to that data, the signal $C_{12}$ for controlling the second input/output port 12, that is, for determining whether the input/output port 12 is put into an output; accepting state or into an output inhibiting state, is output from the mode register 14. The second input/output port 12 is set in an output condition, the internal write control signal (WR) and the internal read control signal (RD) generated by the timing control circuit 20 are output through that port 12 to the external bus 17 and coupled thereby to another device (another information processor or a controlled device). Also they are transferred to the port control circuit 13. In this operation, the illustrated information processor operates as a control unit (master). It is to be noted that the input/output state of the first input/output port 11 is controlled by the internal RD and WR signals which are branched from the external bus 17 through the signal line 21. On the other hand, the second input/output port 12 is then set in an output inhibiting state. The external WR and RD signals from the external device are transferred to the port control circuit 13 through the external bus 17 and the signal line 21. Hence, the first input/output port 11 is put into an inputting state or into an outputting state depending upon the $\overline{RD}$ and $\overline{WR}$ signals which have been externally transferred to the port control circuit 13 through the external bus 17 and the signal line 21. In this operation, the information processor C operates as a controlled unit. However, in either case, the input/output port control circuit 13 is controlled by the control signal $C_{13}$ which is output according to the contents of the mode register 14.

It is to be noted that in the second input/output port 12, provision is made for the internal bus 15 and the external bus 17 to be electrically connected to each other so that, upon a particular condition of the mode register 14, the second input/output port 12 can operate merely as an input/output port for information, similar to the first input/output port 11. Here it is assumed that each of the first and second input/output ports 11 and 12 includes at least one one-bit register (for instance, a flip-flop) for temporarily storing information and input and output buffers for controlling the information transmission direction.

According to the illustrated embodiment, depending upon the contents of the mode register, an information processor can operate as a master which can control at least one external device by applying internal RD and WR signals and as a slave which is controlled by at least one external apparatus by receiving external RD and WR signals. Moreover, in either case since information transmission is effected through the external bus 16, the information processor can be coupled directly to another external device through an external bus. In other words, a multi-processor system can be constructed without employing a memory-based system, and therefore, information can be transferred at a high speed. Furthermore, in the above-described embodiment, the external and internal RD and WR signals can be transferred through the same terminals. Hence there is no need to separately provide terminals to be solely used for the external and internal signals. Accordingly, the illustrated arrangement is greatly effective for reducing the size and lowering the cost of the information processor.

Figure 4:
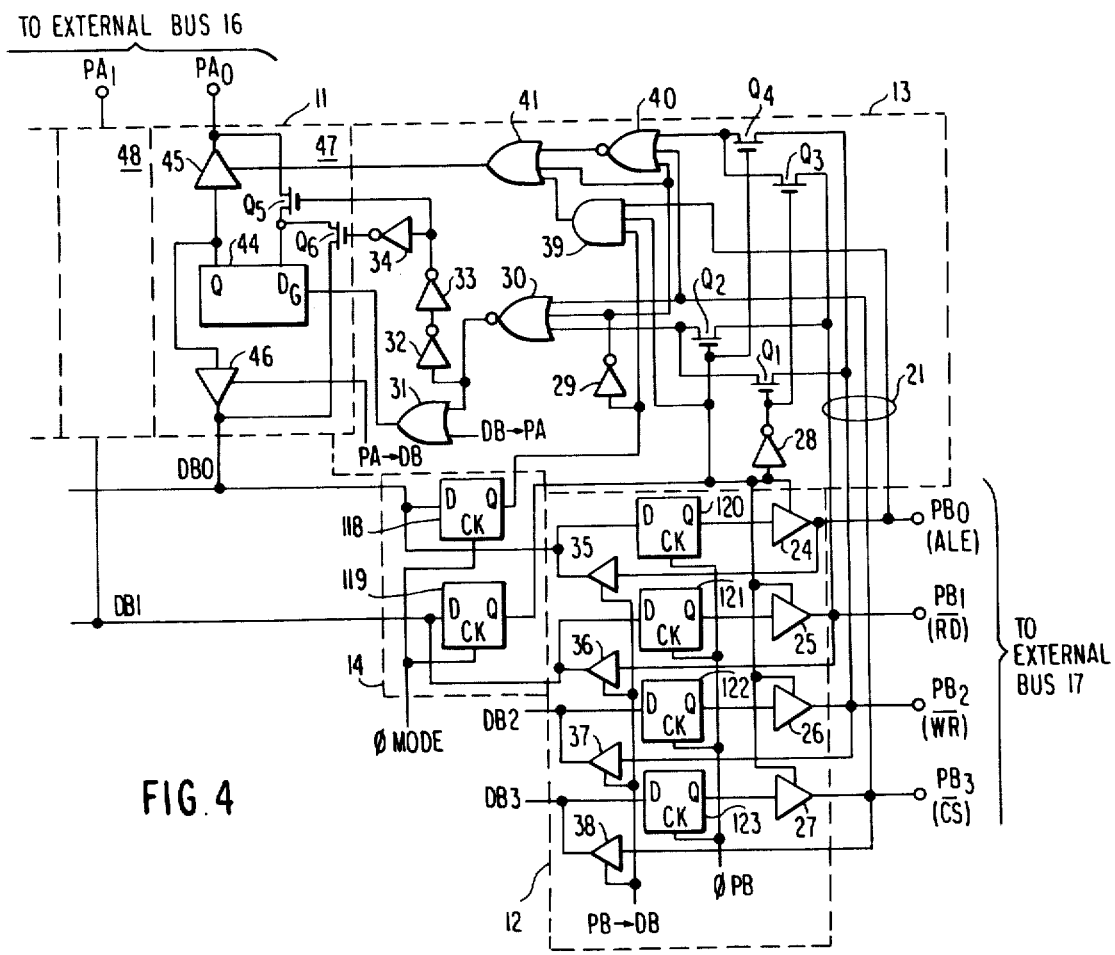
FIG. 4 is a detailed circuit diagram of the input/output interface section shown in FIG. 3.

A more detailed circuit diagram, corresponding to the block diagram of FIG. 3, is shown in FIG. 4. The operation of this circuit will now be described in detail. In FIG. 4 are illustrated the respective circuit elements of a part of the first input/output port 11, a part of the second input/output port 12, the input/output port control circuit 13 and the mode register 14, and the interconnections therebetween. In the illustrated embodiment, the first input/output port 11 is divided into a plurality of blocks, each block of which has a register for temporarily storing one bit of information. The register can, for instance, be a delay-type flip-flop. The number of blocks is equal to the number of signal lines forming the external bus 16. Furthermore, with regard to the second input/output port 12 also, there are provided nearly identical blocks which are equal in number to the number of signal lines forming the external bus 17. in addition, the first and second input/output ports are wired in common to the corresponding ones of the signal lines forming the internal bus 15. Here, the terminals of the first input/output port 11 connected to the external bus 16 are designated by reference symbols $PA_o \sim PA_n$, while the terminals of the second input/output port 12 connected to the external port 17 are designated by reference symbols $PB_o \sim PB_m$. In FIG. 4, only one block having a terminal $PA_o$ in the first input/output port (hereinafter called port A) 11 and four blocks having terminals $PB_o \sim PB_3$ in the second input/output port (hereinafter called port B) 12 are shown in detail for purposes of simplicity. It is to be noted that the subscripts n and m are arbitrary integers, and they can be identical or different.

As mentioned above, in FIG. 4, reference symbols $DB_o$, $DB_1$, $DB_2$ and $DB_3$ denote a part of the internal data bus 15, reference symbols $PA_o$ and $PA_1$ denote a part of a terminal group of the first input/output port 11, and reference symbols $PB_0(ALE)$, $PB_1(\overline{RD})$, $PB_2(\overline{WR})$ and $PB_3(\overline{CS})$ denote a part of a terminal group of the second input/output port 12. Delay type flip-flips 118 and 119, which correspond to the mode register 14 in FIG. 3, jointly form a mode register in which data for determining the control mode is to be set. These flip-flops output data (that is, the control signal $C_{13}$ in FIG. 3) when a clock signal $\phi_{MODE}$ generated by decoding an instruction changes state from "0" to "1". On the other hand, reference numerals 120, 121, 122 and 123 designate delay type flip-flops in the respective blocks forming a part of the second input/output port 12. These delay type flip-flips output the information received through the internal data bus lines $DB_0$, $DB_1$, $DB_2$ and $DB_3$, respectively, when a clock signal $\phi_{PB}$ generated by decoding an instruction changes state from "0" to "1". The information is read out through three-state buffers $24 \sim 27$ and the corresponding terminals $PB_0 \sim PB_3$ to the external bus 17. These buffers $24 \sim 27$ are controlled by the output signal of the flip-flop 119 of the mode register 14. When the output of this mode register flip-flop 119 is "0", the outputs of all the buffers are placed in a floating state and hence output there-from is inhibited. Accordingly, at this moment the terminals $PB_0 \sim PB_3$ can be used as input terminals. On the other hand, when the content of the mode register flip-flop 119 is "1", the information set in the flip-flops $120 \sim 123$ are output from the respective terminals $PB_0(ALE)$, $PB_1(\overline{RD})$, $PB_2(\overline{WR})$ and $PB_3(\overline{CS})$. In other words, these respective terminals are used as output terminals. Here, it is to be noted that in the case where the terminals $PB_0 \sim PB_3$ are used as input terminals, the information from an external apparatus can be transferred to the internal bus signal lines $DB_0 \sim DB_3$ only when input stage buffers $35 \sim 38$ are driven by an instruction (PB→DB).

On the other hand, with regard to the first input/output port 12, as illustrated in detail only for a representative block 47 corresponding to one bit, each block includes a register (delay type flip-flop) 44 which can temporarily store information of one bit, a buffer 45 for outputting the content of the register 44 to the terminal $PA_0$ and a buffer 46 for outputting the content of the register to the internal bus signal line $DB_0$. The drive state of the buffer 45 is controlled by an output signal of an OR gate 41, and the drive state of the buffer 46 is controlled by an instruction (PA→DB). A block 48 having the same structure as the block 48 is provided between the terminal $PA_1$ and the internal bus signal line $DB_1$. The other blocks not shown can be constructed in the same manner.

Now, the details of the input/output port control circuit 13 will be explained. An output signal of an inverter 28 is applied in common to a gate electrode of an enhancement type insulated gate field effect transistor (hereinafter abbreviated as IGFET) $Q_1$ and a gate electrode of a like enhancement type IGFET $Q_3$. The state of this output signal is determined in accordance with the content of the mode register flip-flop 119. In addition, the output signal of the mode register flip-flop 119 is directly applied to the respective gate electrodes of enhancement type IGFET's $Q_2$ and $Q_4$. These four IGFET's are used as transfer or selection gates. The source electrode of the IGFET $Q_1$ is connected to the terminal $PB_2(\overline{WR})$, and the source electrode of the IGFET $Q_2$ is connected to the terminal $PB_1(\overline{RD})$. The drain electrodes of the IGFET's $Q_1$ and $Q_2$ are connected in common to an input of a NOR gate 30. The source electrode of the IGFET $Q_3$ is connected to the terminal $PB_1(\overline{RD})$, and the source electrode of the IGFET $Q_4$ connected to the terminal $PB_2(\overline{WR})$. The respective drain electrodes of the IGFET's $Q_3$ and $Q_4$ are connected in common to one input of a NOR gate 40. Accordingly, if the content of the mode register flip-flop 119 is "0" the IGFET's $Q_2$ and $Q_1$ are turned OFF, while the IGFET's $Q_1$ and $Q_3$ are turned ON. Consequently, the NOR gate 30 outputs the information from the terminal $PB_2(\overline{WR}$ signal), and the NOR gate 40 outputs the information from the terminal $PB_1(\overline{RD}$ signal). On the other hand, if the content of the mode register flip-flop 119 is "1", then the IGFET's $Q_2$ and $Q_4$ are turned ON, while the IGFET's $Q_1$ and $Q_3$ are turned OFF. Accordingly, the NOR gate 30 outputs the information from the terminal $PB_1(\overline{RD}$ signal), and the NOR gate 40 outputs the information from the terminal $PB_2(\overline{WR}$ signal). In addition, an output signal from the mode register flip-flop 118 is sent to an inverter 29 and an AND gate 39. The output signal of the inverter 29 is applied in common to the NOR gate 30, the NOR gate 40 and the OR gate 41. The respective outputs of the AND gate 39 and the NOR gate 40 are connected to corresponding inputs of the OR gate 41. The output signal from the OR gate 41 is applied to the control terminal of the output stage buffer 45 in the first input-/output port 11. It is to be noted that this output signal is applied in common to the control terminals of the respective output stage buffers within all the other blocks in the first input/output port 11.

Furthermore, the output signal from the NOR gate 30 is applied to the OR gate 31 and a delaying inverter 32. The output of the inverter 32 is further connected to similar delaying inverters 33 and 34, which are connected in series. The output signal from the inverter 33 is applied to a gate electrode of an enhancement type IGFET $Q_5$, and the output signal from the inverter 34 is applied to a gate electrode of an enhancement type IGFET $Q_6$. The source electrode of the IGFET $Q_5$ is connected to the terminal $PA_0$, and the source electrode of the IGFET $Q_6$ is connected to the internal data bus signal line $DB_0$. The respective drain electrodes of the IGFET's $Q_5$ and $Q_6$ are connected to a D-input of a register (latch circuit) 44 in the first input/output port 11. The register 44 receives and stores information at times determined by a control signal output from the OR gate 31 in response to an instruction (DB→PA). The Q-output signal of the register 44 is transferred to the three-state buffers 45 and 46.

The signals PA→DB, DB→PA and PB→DB appearing in FIG. 4 are timing control signals generated by the timing control circuit 20 by decoding instructions (for instance, microinstructions read out of an ROM or the like). The signal PA→DB is generated when an instruction that a signal input through the terminals PA should be transferred to the internal bus DB is executed. The signal DB→PA is generated when an instruction that a signal on the internal bus DB should be transferred to the terminals PA is executed. The signal PB→DB is generated when an instruction that a signal input through the terminals PB should be transferred to the internal bus DB is executed. Operations based on these respective instructions are executed within a predetermined machine cycle. The terminals $PB_0 \sim PB_3$ serve to output a signal on the internal bus $DB_0 \sim DB_3$ to the external bus 17 or to input a signal applied from the external bus 17 to the internal bus $DB_0 \sim DB_3$. Furthermore, these terminals are also used as terminals for inputting or outputting the ALE (address latch enable) signal, $\overline{RD}$ (read control) signal, $\overline{WR}$ (write control) signal and $\overline{CS}$ (chip selection) signal.

The functions of the first and second input/output ports 11 and 12 are controlled by the contents of the flip-flop 118 and 119 to realize four kinds of interface modes (A, B, C and D) as indicated in Table 1.

TABLE 1

| Interface Mode | Q-output of flip-flop 118 | Q-output of flip-flop 119 | Functions of the first and second input/output ports |
|---|---|---|---|
| A | 0 | 0 | The first I/O port is in an output mode, and the second I/O port is in an input mode. |
| B | 0 | 1 | The two I/O ports are both in an output mode. |
| C | 1 | 0 | The controlled mode in which the processor C is controlled by another unit to operate as a slave unit. |
| D | 1 | 1 | The control mode in which the processor C controls another unit to operate as a master unit. |

In the mode A, the contents of the flip-flops 118 and 119 of the mode register 14 are made to be both "0". Because of "0" output of the flip-flop 119, the output of the three-state buffers 24, 25, 26 and 27 are all inhibited, that is, the buffers are in the floating state, and accordingly the terminals $PB_0$, $PB_1$, $PB_2$ and $PB_3$ of the second input/output port all operate as input terminals. Since the content of the flip-flop 118 is "0", a signal for driving the three-state buffer 45 is output from the OR gate 41, so that the terminal $PA_0$ (and the other PA terminals in the same PA terminal group) of the first input/output port serves as an output terminal. In other words, the first input/output port 11 (FIG. 3) is set in an output mode, whereas the second input/output port 12 is set in an input mode. In this state, if the instruction DB→PA is executed, a signal "1" is output from the OR gate 31 and the inverter 34, so that information on the data bus line $DB_0$ is written in the register 44. Subsequently, this information stored in the register 44 is read out of the Q-output terminal, and is output to the terminal $PA_0$ via the buffer 45. Moreover, since the terminals $PB_0$, $PB_1$, $PB_2$ and $PB_3$ are then ready for use as input terminals, when the input stage buffers 35, 36, 37 and 38 are driven in response to the instruction PB→DB, information applied through the external bus 17 is transferred to the internal bus DB. This interface mode A can be used as a keyboard scanning mode in which the first input/output port transmits a key strobe output to a keyboard as an external unit and the second input/output port receives a key matrix input from the keyboard.

Figure 5:
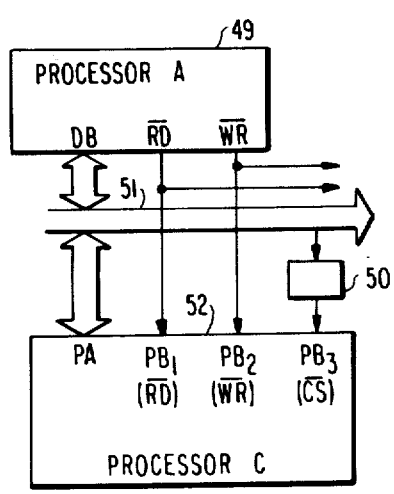
FIG. 5 is a block diagram showing one example of a multi-processor system in which the information processing unit according to the present invention having the input/output interface section shown in FIG. 3 is used as a master.

Under the mode C, the flip-flop 119 is maintained in the "0" state and the content of the mode register flip-flop 118 is changed to "1". Accordingly, the output of the inverter 29 becomes "0". At this moment, since the output of the inverter 28 is "1", the IGFET's $Q_1$ and $Q_3$ are still held ON. In this state, if the $\overline{RD}$ and $\overline{CS}$ signals are input through the terminals $PB_1$ and $PB_3$, respectively, a signal "1" is output from the NOR gate 40 and hence the output stage buffer 45 is driven. Consequently, a signal corresponding to the data held in the register 44 is output to the terminal $PA_0$. The read-out information is transferred to a device (not shown) addressed by the processor which has sent the $\overline{RD}$ signal. On the other hand, if a signl "0" is input through the terminals $PB_2$ and $PB_3$, a signal "1" is output from the NOR gate 30, hence the IGFET $Q_5$ is turned ON, and the register 44 is set in a write state. As a result, information input from the external bus 16 to the terminal $PA_0$ is written in the register 44. Then, by executing the instruction PA→DB, the written information is transferred through the input stage buffer 46 to the internal bus signal line DB. Thus, in this mode where the contents of the mode register flip-flops 118 and 119 are set as "1" and "0", respectively, the second input/output port (12 in FIG. 3) is placed in an input state so as to receive control signals such as $\overline{RD}$, $\overline{WR}$, and $\overline{CS}$. Also in this mode, and the first input/output port (11 in FIG. 3) can assume either the input or output state, as controlled by the control signals input through the terminals of the second input/output port. This is the controlled mode, or the slave mode, in which a micro-processor provided with the input/output circuit shown in FIGS. 3 and 4 is controlled by an external processor. An example of a practical use of this slave mode is illustrated in FIG. 5, which shows a multi-processor system with a processor C 52, including the input/output circuit of FIG. 4, which operates as a controlled or slave unit that is controlled by another processor A 49. In FIG. 5, an external bus 51 interconnects the processors 49 and 52. A selection signal CS fulfills the same purpose as the chip select signal which is employed for addressing a memory chip. This selection signal is generated when the data for selecting the processor 52 have been decoded by a decoder 50. Accordingly, when a signal "1"(non-selection level) is input through the terminal $PB_3$ in FIG. 4, the NOR gates 30 and 40 both output a signal "0". As a result, even if the $\overline{RD}$ and $\overline{WR}$ signals are input through the terminals $PB_1$ and $PB_3$, respectively, the first input/output port (blocks 47, 48, . . . ) is not controlled thereby at all.

Referring back to FIGS. 3 and 4, the content of the mode register flip-flop 118 is set to "0" and the content of the mode register flip-flop 119 to "1", to attain the interface mode B indicated in Table 1. In this state, the outputs of the inverter 29 and the OR gate 41 both become "1" and the buffer 45 becomes active. Accordingly, the information set in the register 44 is output through the terminal PA₀. This means that the first input/output port 11 (FIG. 3) is in an output state. On the other hand, since a signal "0" is output from the NOR gate 30, the IGFET Q₆ is turned ON, and information on the internal signal bus line DB₀ is set in the register 44 via the IGFET Q₆. To achieve this, the instruction DB→PA is executed, where-upon the register 44 executes a latch operation. In this case, as the content of the mode register flip-flop 119 is set at "1", the output stage buffers 24, 25, 26 and 27 become active, and hence the Q-output signals of the flip-flops 120, 121, 122 and 123 are transferred to the terminals PB₀~PB₃. In other words, the second input/output port 12 (FIG. 3) is also in an output state. This interface mode B can be used as a display mode, for instance, for driving a display device in which each digit consists of a plurality of segments. In that case, the first input/output port is used to transmit a segment device output to the display device, and the second input/output port to transmit a digit-drive output.

In the fourth mode D, the contents of the mode register flip-flops 118 and 119 are both "1". Therefore, the output stage buffers 24, 25, 26 and 27 become active, so that the terminals PB₀~PB₃ are used as output terminals. In this instance, the enhancement type IGFET's Q₂ and Q₄ are both turned ON, and the output from the buffer 25 is input to the NOR gate 40 through the IGFET Q₄. When the clock signal $\phi_{PB}$ changes from "0" to "1" in response to a microinstruction, the flip-flops 120, 121, 122 and 123 latch the information on the internal bus lines DB₀~DB₃, respectively. At this moment, due to the output of "1" through the terminal PB₀, the output of the AND gate 39 becomes "1", and thereby the signal set in the register 44 is output through the terminal PA₀. In other words, by outputting "1" through the terminal PB₀(ALE), the first input/output port 11 (FIG. 3) is placed in an output state. This interface mode D is the control or master mode where the second input/output port transmits to an external unit control signals such as $\overline{RD}$, $\overline{WR}$ and ALE to control that external unit, while the first input/output port inputs or outputs data from or to the external unit. This master mode may be used to advantage in a system, such as that shown in FIG. 6, in which a processor C 53, including the input/output circuit shown in FIG. 4, operates as a control or master unit and a processor D 55 (or a peripheral unit, a memory, etc.) operates as a controlled or slave unit. More particularly, by the processor C 53 outputting "1" from the terminal PB₀, the terminals PA are used for outputting an address in which the address data are transferred from the terminals PA to an external bus 54. The processor D 55 receives the transferred address, and as soon as the terminal PB (ALE) becomes "0", data reception is terminated. In this case, the terminals PA of the processor C 53 are placed in an input state because the output of the OR gate 41 in FIG. 4 is "0". On the other hand, because the signal at the terminal PB₁($\overline{RD}$) is "1" and a signal "0" is output from the terminals PB₂($\overline{WR}$) and PB₃($\overline{CS}$), the output stage buffer 45 becomes active, where-upon information latched in response to the microinstruction DB→PA is transferred from the terminals PA. This information is output to the external bus 54 in FIG. 6 and is further transmitted to the terminals DB of the processor D 55. In this case, when the output from the terminal PB₂($\overline{WR}$) shown in FIG. 4 becomes "1", the write processing of information to the processor D 55 is terminated. Then the terminals PA again assume the input. If a signal "1" is output from the terminal PB₁ and a signal "0" is output from the terminals PB₁, PB₀ and PB₃, then the output of the NOR gate 40 is changed to "0" and the output stage buffer 45 is placed in the floating state. In other words, the first input/output port 11 shown in FIG. 3 is placed in the input state. As a result, information transmitted from the processor D (55 in FIG. 6) is set in the register 44 through the data bus 54.

As described above, by providing two flip-flops 118 and 119 in the mode register, four kinds of interface modes (A, B, C and D) as indicated in Table 1 above can be set selectively.

Figure 6:
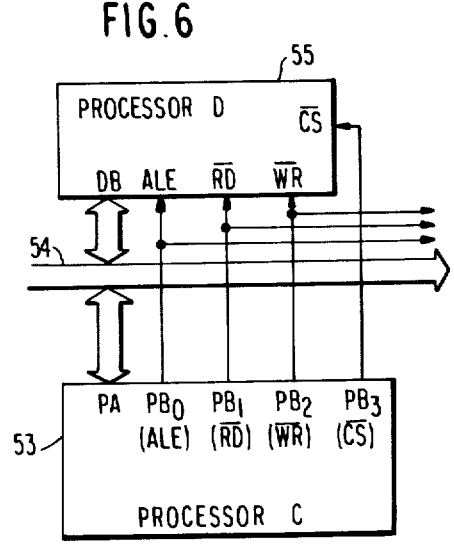
FIG. 6 is another block diagram showing another example of a multi-processor system in which the information processing unit according to the present invention having the input/output interface section shown in FIG. 3 is used as a slave.

As explained in detail above, according to the illustrated embodiment of the present invention, by setting data for designating the operating mode in a mode register, a processor can be used under four modes including the master mode and the slave mode. In addition, since a port control circuit can be used in common for master and slave operations, the processor can be made small in size and also low in cost. Moreover, the same output terminals (PB₁, PB₂) for the $\overline{RD}$ and $\overline{WR}$ signals can be used effectively and efficiently when the processor operates as a master and as a slave. Still further, since these input/output terminals for the $\overline{RD}$ and $\overline{WR}$ signals can be made common with information transmission terminals, more effective utilization of the terminals is achieved. The proposed arrangement is especially effective for an integrated circuit chip having a severely limited number of terminals. Furthermore, as there is no need to allot a part of the information transmission terminals independently as terminals for the $\overline{RD}$ and $\overline{WR}$ signals, the information can be transmitted in a parallel form. In addition, as shown in FIGS. 5 and 6, processors can be directly coupled to each other by making use of an external bus. Accordingly high-speed transmission of information becomes possible. Especially the proposed arrangement is extremely effective in a multi-processor system.

It is to be noted that while an example in which the terminals for the $\overline{RD}$ and $\overline{WR}$ signals are made common with the terminals for information transmission (port B) was described with reference to the preferred embodiment shown in FIG. 4, these respective sets of terminals could be provided independently of each other. In addition, although an embodiment has been described in which the signals RD, WR and the other control signals, which are internally generated, control the input/output port A through the internal bus, delay type flip-flops 120~123 and buffers 24~27, a modification can be made in which these signals are input directly from the internal bus to the port control circuit.

Furthermore, with regard to setting the data in the flip-flops 118 and 119 of the mode register, a modification can be made in which that data are applied externally and set in the mode register through the terminals PB₀ and PB₁, the input buffers 35 and 36 and the internal bus signal lines DB₀ and DB₁. As a result, it becomes possible not only to set the operating mode within the processor but also to externally and directly set the operating mode. Still further, the input/output circuit in FIG. 4 could be provided on the side of a memory or other controlled devices or on the side of other microprocessors.

According to the inventive, concept of the present invention that a reduction in the number of which need be provided is achieved by employing terminals normally used for input and/or output of data for the purpose of input and/or output of control signals the signals ($\overline{RD}$, $\overline{WR}$ and the like). Moreover instead of employing the mode register for designating the input-output state of the second input/output port, it is also possible for the control signals input to or output from the second input/output port to be made different from the normal data signals (for instance, by making the logic amplitudes of the control signals and the data signals different from each other, or by adding a code for discriminating the control signals from the data) and the input/output state of the first input/output port controlled by detecting the difference. Still further, it is also possible that for the second input/output port to be set in, input state in response to the content of the mode register, and that the input/output state of the first input/output port controlled by only the control signal which is input at that moment. Otherwise, the input/output of the first input/output port could be controlled by cooperation of the aforementioned control signals and the contents of the mode register.

What is claimed is:

1. An information processing unit, comprising:
   first external terminal means;
   second external terminal means;
   an internal bus provided within said information processing unit for transferring information;
   first input-output port means coupled to said first external terminal means and said internal bus;
   second input-output port means coupled to second external terminal means and said internal bus;
   a receiving circuit coupled to said second external terminal means and said first input-output port means, said receiving circuit receiving control signals from said second external terminal means and applying first signals to said first input-output port means in response to said received control signals, said first signals controlling said first input-output port means so as to allow data from said internal bus to be transferred via said first input-output port means to said first external terminal means or so as to allow data received at said first external terminal means to be transferred via said first input-output port means to said internal bus, according to the content of said first signals;
   control signal generating means coupled to said internal bus for generating signals for controlling an external device coupled to said information processing unit; and
   mode register means coupled to said internal bus, said second input-output port means and said receiving circuit for storing information generated by said information processing unit and for designating a first state in which said signals generated by said control signal generating means are transferred via said second input-output means and said second external terminal means to both a further device located externally of said information processing unit and to said receiving circuit, a second state in which control signals originating externally of said information processing unit are transferred to said receiving circuit via said second external terminal means, a third state in which data on said internal bus is transferred to said second external terminal means via said second input-output port means, and a fourth state in which data transmitted from a location external of said information processing unit is transferred from said second external terminal means to said internal bus via said second input-output port means.

2. The information processing unit of claim 1, wherein said signals generated by said control signal generating means and transferred to said receiving circuit in said first state include one of a first write-command signal and a first read-command signal, and wherein the control signals received at said second external terminal means and transferred to said receiving circuit in said second state include one of a second write-command signal and a second read-command signal, said receiving circuit controlling said first input-output port means to transfer data from said internal bus to said first external terminal means in response to said first write-command signal or said second read-command signal, and from said first terminal means to said internal bus in response to said first read-command signal or said second write-command signal.

3. The information processing unit of claim 1, wherein said second input-output port means electrically isolates said internal bus from said second external terminal means in response to said mode register means designating said second state and electrically connects said internal bus to said second external terminal means in response to said mode register means designating said first, third or fourth states.

4. An information processor, comprising:
   an internal data bus,
   at least one first external terminal,
   first port means coupled to said internal data bus and said first external terminal and having a first means for transferring data from said internal data bus to said first external terminal and a second means for transferring data from said first external terminal to said internal data bus,
   a plurality of second external terminals,
   second port means coupled to said internal data bus and said second external terminals and having a third means for operatively connecting said internal data bus to said second external terminals,
   first control means coupled to said first port means and said second external terminals and controlling said first means and said second means of said first port means in reponse to control signals applied to said first control means from a source external to said processor via said second external terminals, or from the inside of said processor via said second port means and said second external terminals, and
   second control means coupled to said first control means and said second port means for controlling said first control means and said third means of said second port means to transfer data between said internal data bus and said external terminals and to and from means external of said processor, by connecting said third means while inhibiting said first control means from receiving data from said second external terminals, and to transfer said control signals received at said second external terminals from a source external of said processor to said first control means, while disconnecting said third means.

* * * * *

UNITED STATES PATENT AND TRADEMARK OFFICE
CERTIFICATE OF CORRECTION

PATENT NO. : 4,470,113

DATED : September 4, 1984

INVENTOR(S) : Toshio OURA

It is certified that error appears in the above-identified patent and that said Letters Patent is hereby corrected as shown below:

Column - Abstract - line 9, change "busses" to --buses--

Column 1, line 19, add a comma after "cally"

Column 1, line 21, add a comma after "vices"

Column 1, line 36, insert a comma after "located"

Column 1, line 64, delete the comma after "future"

Column 2, line 21, add a comma after "Also"

Column 2, line 22, change "multiprocessor" to --multi-processor--

Column 2, line 29, change "multiprocessor" to --multi-processor--

UNITED STATES PATENT AND TRADEMARK OFFICE
CERTIFICATE OF CORRECTION

PATENT NO. : 4,470,113
DATED : September 4, 1984
INVENTOR(S) : Toshio OURA

It is certified that error appears in the above-identified patent and that said Letters Patent is hereby corrected as shown below:

Column 2, line 67, delete "increase in expense" and insert --increased costs--

Column 3, line 9, change "microprocessor" to --micro-processor--

Column 3, line 21, change "multiprocessor" to --multi-processor--

Column 3, line 29, delete ";" after "unit"

Column 3, line 60, after "the" insert --outside--

Column 5, line 12, after "Therefore" insert --,--

Column 5, line 61, delete "by inself"

Column 5, line 63, add a --)-- after "$\overline{WR}$"

UNITED STATES PATENT AND TRADEMARK OFFICE
CERTIFICATE OF CORRECTION

PATENT NO. : 4,470,113
DATED : September 4, 1984
INVENTOR(S) : Toshio OURA

It is certified that error appears in the above-identified patent and that said Letters Patent is hereby corrected as shown below:

Column 5, line 64, insert --)-- after "RD"

Column 6, line 6, insert a comma after "9"

Column 6, line 28, add an --s-- to the second occurrence of "signal"

Column 7, line 25, change "date" to --data--

Column 7, line 52, change "its" to --is--

Column 7, line 52, "is" should be --its--

Column 8, line 1, delete ";" after "output"

Column 8, line 9, insert a comma after "also"

Column 8, line 48, add a comma after "case"

Column 9, line 33, second occurrence of "flips" should be --flops--

Column 9, line 43, delete "flips" (2nd occurr.) and insert --flops--

UNITED STATES PATENT AND TRADEMARK OFFICE
CERTIFICATE OF CORRECTION

PATENT NO. : 4,470,113
DATED : September 4, 1984
INVENTOR(S) : Toshio OURA

It is certified that error appears in the above-identified patent and that said Letters Patent is hereby corrected as shown below:

Column 9, line 54, change "there-from" to --therefrom--

Column 11, line 36, change "flop" to --flops--

Column 12, line 15, delete "Under" and insert --In--

Column 12, line 42, delete "and"

Column 13, line 3, insert --hence-- after "and"

Column 13, line 11, change "where-upon" to --whereupon--

Column 13, line 64, change "where-upon" to --whereupon--

Column 14, line 5, after "input" insert --state--

Column 14, line 51, change "RD and WR" to --$\overline{RD}$ and $\overline{WR}$--

Column 15, line 2, after "of" insert --terminals--

Column 15, line 5, add a --)-- before "the--

Column 15, line 6, delete the "(" before "RD"

Column 15, line 6, add a comma after "moreover"

UNITED STATES PATENT AND TRADEMARK OFFICE
CERTIFICATE OF CORRECTION

PATENT NO. : 4,470,113

DATED : September 4, 1984

INVENTOR(S) : Toshio OURA

Page 5 of 5

It is certified that error appears in the above-identified patent and that said Letters Patent is hereby corrected as shown below:

Column 15, line 7, change "input-out" to --input/out--

Column 15, line 18, delete the comma after "in" and insert --the--

Column 15, line 22, insert --condition-- after "output"

Column 16, line 49, change "reponse" to --response--

Signed and Sealed this

Nineteenth Day of November 1985

[SEAL]

Attest:

DONALD J. QUIGG

Attesting Officer

Commissioner of Patents and Trademarks